April 28, 1959     G. W. OYLER ET AL     2,884,510
CONSTRICTED ARC APPARATUS AND PROCESS
Filed Oct. 17, 1955

INVENTORS
GLENN W. OYLER
JOHN MAIER, III
THOMAS B. REED

BY Barnwell R. King
ATTORNEY

United States Patent Office 2,884,510
Patented Apr. 28, 1959

2,884,510

CONSTRICTED ARC APPARATUS AND PROCESS

Glenn W. Oyler, Springfield, and John Maier III, Newark, N.J., and Thomas B. Reed, Grand Island, N.Y., assignors to Union Carbide Corporation, a corporation of New York Application October 17, 1955, Serial No. 540,951

9 Claims. (Cl. 219—69)

This invention relates to constricted and wall-stabilized arcs of the type disclosed in copending application Serial No. 524,353, filed July 26, 1955, by Robert M. Gage, now Patent No. 2,806,124, and more particularly to the use of hydrogen in such arcs for removing metal from a workpiece.

According to the invention there is provided a novel process of removing selected metal from a metal workpiece, which comprises heating and melting the metal to be removed with an effluent containing hydrogen discharged with a constricted and wall-stabilized arc which is electrically transferred to such workpiece. Other elements such as argon, helium, and nitrogen may be advantageously mixed with hydrogen in the arc gas. The workpiece may be any metal or alloy, and the metal removal operation may be any desired working, conditioning, cutting, gouging, scarfing, desurfacing, deseaming, piercing, and the like.

More particularly the invention provides a process of severing a metal workpiece which comprises feeding gas containing hydrogen to a constricted and wall-stabilized arc, applying the resultant effluent to such workpiece to melt and remove metal adjacent said effluent, said workpiece being in circuit with such arc, and advancing said effluent relative to such workpiece to progressively melt the metal to form a kerf therein along a desired path. Such hydrogen has the beneficial effects of substantially diminishing the dross, improving the quality of the so cut surfaces, and also increasing the efficiency and speed of the severing operation.

Further, according to the invention, the metal removal is thermochemically assisted by feeding a separate stream of fluid containing adjuvant powder into the effluent at the most effective point for such purpose. Also, any residual dross that may otherwise result is removed by applying an auxiliary jet of suitable fluid, flame or arc against such dross while it is still molten.

Figure 1:
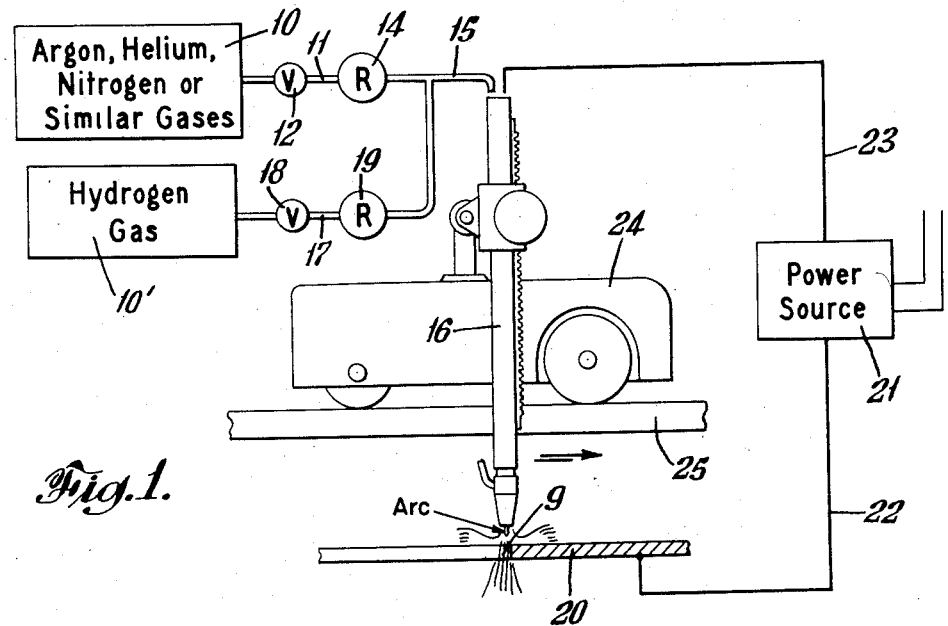
Fig. 1 is a view mainly in side elevation of a plate cutting setup illustrating the invention.

As shown in Fig. 1 a selected gas to be used with hydrogen as the arc-gas is supplied under pressure from a source 10 through a feed pipe 11 containing a valve 12 and pressure regulator 14 to gas conduit 15 leading to the arc torch 16. The hydrogen gas is similarly supplied from a source 10' to the gas conduit 15 through a feed pipe 17 containing a valve 18 and a pressure regulator 19. The arc torch 16 is basically like the cutting torch disclosed in the copending application Serial No. 524,353, filed July 26, 1955, by Robert M. Gage, for "Arc Torch and Process," in that the arc and gas are constricted and wall-stabilized before they are discharged to provide a common high velocity effluent 9. Such effluent 9 is applied to a workpiece 20, such as a metal plate, that is connected to one side of an electrical power source 21, such as a generator, by a lead 22. The other side of such source 21 is connected to the torch electrode by a lead 23. The torch 16 is carried by a speed-regulated self-propelled carriage 24 that runs on a track 25 in the direction to be cut parallel to the top of such plate.

In operation the effluent 9 is discharged from the torch 16, and the carriage is run in the desired direction, causing such effluent to sever the plate, as illustrated in Fig. 1, by melting a kerf therein.

Figure 2:
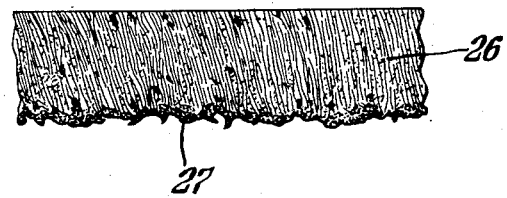
Fig. 2 is a view in elevation of a kerf wall resulting from the use of argon as the arc gas.
Figure 3:
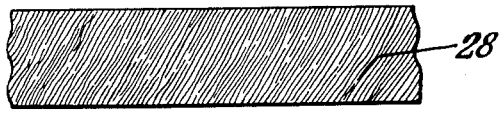
Fig. 3 is a similar view of a kerf wall resulting from the use of arc-gas of the invention.

To obtain good quality cuts with the arc torch cutting process, it is essential that hydrogen be added to the shielding atmosphere. The addition of even one percent hydrogen to argon or helium improves the quality of the kerf walls over that normally obtained using argon or helium. The improvement in quality increases until an addition of approximately 35 percent $H_2$ to A is made. Above this percentage, the quality remains substantially constant, providing the flow rate of the gas feed to the torch is increased in proportion to the change in hydrogen concentration of the arc gas, since hydrogen is a very light gas. Thus, to obtain good quality cuts using higher hydrogen concentrations, it is desirable to employ at least twice the gas flow rate that is used for lower hydrogen concentrations, such as 35 percent hydrogen. This improvement in quality is evident in Figs. 2 and 3. Fig. 2 shows a kerf wall of ¾-inch aluminum plate having a rough, oxidized appearance with attached dross 27, which was cut using argon alone as the arc gas. Fig. 3 shows a plate 28 of like material having a smooth, shiny surface with sharp corners and no dross, which was made with a 65 percent argon–35 percent hydrogen mixture as the arc gas. The improvement in kerf-wall quality is most probably the result of hydrogen being a reducing gas, thereby preventing oxygen from coming into contact with the molten surface. Thus, hydrogen additions from 1 to 100 percent added to an inert gas greatly improve the quality of the kerf with the maximum quality being reached using approximately 35 percent hydrogen.

An additional benefit of hydrogen is the obtainment of a relatively high voltage arc. This is the result of hydrogen having a high electrical resistance. High voltage is desirable in this process, especially in the cutting of heavy plate, to force the cutting action to penetrate through the thickness of the plate and simultaneously give excellent kerf-quality. The employment of high voltages also permits the use of lower amperages to obtain the necessary heat input. Since the present limitation of the equipment is the current-carrying capacity of the nozzles, it is very desirable to have a high heat input with as low an amperage as possible. The voltage of the arc increases as the hydrogen content of the arc atmosphere increases. Thus, the higher the hydrogen concentration, the higher the voltage. Also, at a constant amperage, it is possible to sever work at higher speeds using hydrogen additions since the heat input to the work is proportionately increased by the increase in voltage.

Because of the higher arc voltage resulting from the use of hydrogen or hydrogen-containing mixtures flowing through the small diameter orifice, it is essential that a relatively high open-circuit voltage power supply be utilized. For example, using a 35 percent hydrogen addition to inert gas, an 80 volt open-circuit power supply is satisfactory; whereas, using 100 percent hydrogen, at least a 160 volt open-circuit power supply is necessary. The required open-circuit voltage is approximately directly proportional to the hydrogen content of the atmosphere. If the necessary open-circuit voltage is not provided, the arc cannot be initiated, since the arc, ampere-voltage, characteristic curve does not intersect the power-supply, ampere-voltage characteristic curve.

Another advantage of adding hydrogen is the minimization of the double-arcing phenomenon which is the preference of the arc to establish two independent arcs through the nozzle; the occurrence of this condition damages or destroys the nozzle. Since hydrogen has a very high resistance, it apparently forms an insulating layer between the issuing arc and the inside of the nozzle orifice. This insulating layer retards the tendency of the arc to jump from the tungsten or copper electrode to the nozzle and then to the base plate.

Also advantageous in this process is the breakdown of the hydrogen molecule to the hydrogen atom. Thus, two volumes of gas are produced for each volume of metered gas, which is dissociated, $H_2 \to 2H$. This breakdown produces an added high velocity while using low metered gas flows. This jet effect is essential to the process for the removal of the molten metal and dross from the kerf walls. In addition, the recombination of the hydrogen molecules at the base plate provides a concentration and high transfer efficiency of heat at exactly the desired point.

The lighter the gas used, the higher the velocity that can be obtained. Therefore, since atomic hydrogen is the lightest gas known, it provides an extremely high velocity jet stream with concurrent high heat intensity which melts and removes the metal in the kerf and mechanically scrubs the kerf walls.

Our recommended atmospheres are the 80 percent argon–20 percent hydrogen mixture for hand cutting and the 65 percent argon–35 percent hydrogen for machine cutting. The employment of these mixtures is based on the open-circuit voltage being limited to a maximum of 100 volts. The lower percentage hydrogen addition is recommended to minimize the criticality of arc length, thus allowing for the arc length variation caused by the operator's hand. At the same time, if an open-circuit voltage of at least 160 volts is employed, pure hydrogen can be employed satisfactorily.

The following example demonstrates the improvement in heat transfer to the work when hydrogen gas is added in appreciable quantity to the argon gas. A transferred type arc torch with a 1/8-inch diameter tungsten electrode spaced 3/8-inch back from the edge of a 12° taper, 1/8-inch opening water-cooled copper torch nozzle was used in the following manner. Argon gas flows of 10, 20, 40, and 60 c.f.h. were used respectively with 140, 260, 185, and 170 amperes D.C.S.P. arc power at voltages of 30 to 50 volts from the tungsten electrode through the torch nozzle to a 3/4-inch thick cold copper plate. Some discoloration and only a slight occasional fusion of the copper work surface resulted.

These tests were continued with the addition of hydrogen gas to the argon torch gas. It was found that the torch powered with a 100-volt open circuit Lincoln D.C. welder power supply could not be started and maintained unless the arc was first established in argon with at most a small amount of hydrogen in admixture. Thereafter it was possible to increase the hydrogen up to 25–30 percent and maintain the work arc. From these tests it was concluded that pure hydrogen in such a torch might require about 150 volts. As the hydrogen content was increased the depth of fusion of the copper also increased. At a hydrogen content of 25 percent in argon with a total flow of 75 c.f.h. through the torch and at 200 amperes, 78 volts, D.C. arc power a groove 0.1 inch deep by 0.15 inch wide was formed in the copper at 30 i.p.m. travel speed. The removed metal was blown out of the path by the high jet velocity.

Also an arc torch with a 3/16-inch tungsten electrode set back 5/16-inch from a 1/8-inch diameter x 1/16-inch long water-cooled copper orifice was used with 68 c.f.h. of 40 percent hydrogen in argon at 165 amperes D.C.S.P. and 102 volts to cut one inch thick stainless steel plate at 23.5 i.p.m.

Another non-transferred arc torch comprising a 1/8-inch diameter tungsten stick electrode set back 1/4-inch from the torch face and an orifice consisting of water-cooled copper with a tungsten insert about 3/32-inch long with an 0.080 inch diameter axial hole was used with 142 c.f.h of hydrogen, 15.5 p.s.i.g. chamber pressure at 215 amperes, 93 volts D.C. between the tungsten stick cathode and the nozzle. The hydrogen jet issuing from the arc through the nozzle was effective in cutting 1" thick aluminum at 25 i.p.m. producing a high quality straight-walled cut.

The same torch described above, except that the tungsten nozzle insert was 1/4-inch long and had a 1/16-inch diameter hole orifice, was used with 100 c.f.h of hydrogen, chamber pressure 23 p.s.i.g, and 170 amperes, 84 volts, D.C. power producing a hydrogen jet effluent that cut 1" thick stainless steel plate at 6 i.p.m. The cut was very square on the edges and the kerf surfaces were remarkably smooth.

The following table shows the typical speeds and conditions of machine cutting obtained by using the process for various thicknesses of aluminum plate, with a power supply having an open-circuit voltage of 100 volts.

| Thickness, in. | Speed, i.p.m. | Amps. | Volts | Gas Flow [1] c.f.h. |
|---|---|---|---|---|
| 1/4 | 300 | 320 | 70 | 50 |
| 1/2 | 125 | 320 | 75 | 60 |
| 3/4 | 75 | 320 | 77 | 70 |
| 1 | 50 | 320 | 80 | 70 |

[1] In all cases, the gas used is an argon-hydrogen mixture in the proportions 65 percent–35 percent.

The speed and quality of manual cutting vary according to operator skill with an average speed of about 60 inches per minute on 1/2-inch aluminum plate. In manual cutting, the gas proportion used is 20 percent hydrogen–80 percent argon.

The illustrated arc-torch cutting apparatus was used in the following tests. The difference in technique from cutting was merely the tilting of the torch from right angles to a leading angle of approximately 45 degrees with the work surface. This apparatus was used for gouging, scarfing, deseaming, desurfacing and metal-conditioning. The depth of scarfing or gouging is primarily controlled by the speed, torch angle, amperage level, and gas flow rate. An increase in speed with the other variables constant will result in a decrease in the depth of the gouge. An increase in amperage will likewise result in an increase in gouge depth. The torch angle and gas flow rate control the quality as well as the depth of the gouge. The width of the gouge or groove is primarily controlled by the configuration of the orifice. In this work, round orifices only were employed. However, it is expected that elliptical or slot-type orifices would be beneficial.

Various atmospheres can be used with this process such as argon, helium, nitrogen, hydrogen, oxygen, and various combinations of these gases. Optimum quality grooves were obtained with a 35 percent hydrogen–65 percent argon mixture. The flow rate of the gases was kept constant at 70 c.f.h. with 20 p.s.i. meter pressure. Higher speeds and deeper gouges could most probably be obtained by employing higher pressures and higher flow rates. The utilization of the gas provides a jet stream or washing action to remove the dross from the grooved portion.

This process can be used both manually and mechanically with the attainment of equal quality. This process works satisfactorily on both cold and hot materials with its use on hot materials giving higher speed operation. Since this is a melting process, any metal can be gouged or scarfed. The speed of the operation depends on the melting point and thermal conductivity of the metal to be conditioned.

Single- or multiple-pass gouging can be accomplished with equal ease of operation. Multiple-torch operation can be employed if wide gouges or scarfs are required.

Auxiliary jets of gas have been used to facilitate the metal removal from the gouges. These gases can be either air, oxygen, nitrogen, hydrogen, argon, or helium depending upon the quality desired.

Several examples of gouges that can be obtained by the invention are shown in the following table:

| Gouge No. | Amperage | Voltage | Speed, i.p.m. | Flow, c.f.h. | Torch Angle |
|---|---|---|---|---|---|
| 1 | 150 | 63 | 105 | 70 | 50 |
| 2 | 150 | 63 | 130 | 70 | 50 |
| 3 | 145 | 62 | 145 | 70 | 50 |
| 4 | 140 | 63 | 180 | 70 | 50 |
| 5 | 140 | 63 | 200 | 70 | 50 |
| 6 | 140 | 60 | 225 | 70 | 50 |
| 7 | 130 | 60 | 290 | 70 | 50 |
| 8 | 80 | 60 | 290 | 70 | 50 |
| 9 | 120 | 70 | 85 | 70 | 50 |

Hole piercing is another variation of the cutting process. It entails the use of a stationary torch rather than a movable torch. The shape of the hole is primarily controlled by the configuration of the orifice.

The conditions for hole-piercing are like those for cutting with the exception of the employment of a stationary torch. Any thickness of plate that can be cut can also be pierced. Thus, it is evident that the amperage, the gas flow rate and the orifice diameter must be such that complete severing of the plate is obtained. The diameter of the pierced hole is primarily controlled by the size and configuration of the orifice and the degree of over setting of the current.

The following gases can be employed in this process: argon, helium, nitrogen, hydrogen, and any combination of these; however, the argon-hydrogen mixtures give the best operation. Any metal can be pierced as well as cut since this is a melting process.

Several examples of pierced holes that can be obtained were made with the conditions listed in the following table:

| Photo Position | Aluminum Plate, in. | Amperage | Voltage | Hole Diam., Top | Hole Diam., Bottom | Gas Flow |
|---|---|---|---|---|---|---|
| Top | 1 | 240 | | 5/8 | 3/16 | 70 |
| Top center | 3/4 | 260 | 70 | 3/8 | 1/4 | 70 |
| Do | 3/4 | 220 | 70 | 3/8 | | 70 |
| Do | 3/4 | 200 | 70 | 3/8 | 1/8 | 70 |
| Do | 3/4 | 340 | 70 | 1/2 | 1/4 | 70 |
| Bottom center | 1/2 | 180 | | 3/8 | 1/8 | 70 |
| Do | 1/2 | 150 | | 3/8 | 1/4 | 70 |
| Do | 1/2 | 120 | | 3/8 | | 70 |
| Bottom | 1/4 | 100 | | 5/16 | 3/16 | 70 |
| Do | 1/4 | 80 | | 5/16 | 1/8 | 70 |

We claim:

1. Process of removing selected metal from a metal workpiece, which comprises heating and melting the metal to be removed with an effluent containing 1% to 100% hydrogen discharged with a wall-stabilized arc which is electrically transferred to such workpiece.

2. Process as defined by claim 1, in which the arc gas consists of 20% to 35% hydrogen mixed with one or more elements selected from the class consisting of argon, helium, and nitrogen.

3. Process of severing a metal workpiece which comprises feeding argon gas containing 20% to 35% hydrogen to a constricted arc, applying the resultant effluent to such workpiece to melt and remove metal adjacent said effluent, said workpiece being in circuit with such arc, and advancing said effluent relative to such workpiece to progressively melt the metal to form a kerf therein along a desired path, such hydrogen having the beneficial effects of substantially diminishing the dross, improving the quality of the so cut surfaces, and also increasing the efficiency and speed of the severing operation.

4. Process of cutting a body of metal selected from the class consisting of non-ferrous metals and stainless steels, which comprises removing metal from such body by melting the metal to be removed with a constricted and wall-stabilized electric arc comprising a jet of gas consisting of a mixture of 65% to 80% argon and 20% to 35% hydrogen, which jet of gas carries an electric arc energized by current flowing through a circuit that includes such body of metal.

5. Process of removing metal from a metal workpiece which comprises heating the metal to be removed to the melting point and blowing the so melted metal away with an effluent composed of gas that is discharged through an arc constricting orifice with an arc in circuit with such workpiece, which forces such gas into confluence with the arc within such orifice and produces an extremely hot effluent, characterized in that the gas delivered to said orifice contains at least 1% to 35% of hydrogen whereby the process is made more effective and efficient thereby.

6. Apparatus for cutting, severing, piercing, gouging, scarfing, desurfacing, and deseaming a metal workpiece, which comprises the combination of a constricted wall-stabilized arc torch having an electrode, means connecting such workpiece and the torch electrode in circuit with a source of electrical power, and means for delivering to said torch an arc gas comprising 1% to 35% hydrogen.

7. Apparatus as defined by claim 6, in which means are provided for delivering to the torch another gas selected from the class consisting of argon, helium, and nitrogen.

8. Process of cutting metal composed of aluminum and alloys thereof with a wall-stabilized arc which comprises supplying such arc with gas containing about 1% to about 35% by volume of hydrogen, the balance of the arc gas being selected from the class consisting of argon, helium, and nitrogen.

9. Process of rapidly severing aluminum and its alloys with a wall-stabilized arc, which comprises supplying such arc with gas containing about 20% to about 35% hydrogen, the balance of such arc gas being selected from the class consisting of argon, helium, and nitrogen.

References Cited in the file of this patent

UNITED STATES PATENTS

| | | |
|---|---|---|
| 1,002,721 | Mathers | Sept. 5, 1911 |
| 1,298,590 | Smith | Mar. 25, 1919 |
| 1,746,191 | Devers | Feb. 4, 1930 |
| 1,746,208 | Alexander | Feb. 4, 1930 |
| 2,284,351 | Wyer | May 26, 1942 |
| 2,451,422 | Wagner | Oct. 12, 1948 |
| 2,602,871 | Noland et al. | July 8, 1952 |
| 2,640,792 | Binder | June 2, 1953 |
| 2,758,186 | Ludwig | Aug. 7, 1956 |
| 2,806,124 | Gage | Sept. 10, 1957 |